(12) United States Patent
Agrawal et al.

(10) Patent No.: US 9,584,579 B2
(45) Date of Patent: Feb. 28, 2017

(54) METHOD AND SYSTEM FOR PROVIDING PAGE VISIBILITY INFORMATION

(75) Inventors: Shishir Kumar Agrawal, Sunnyvale, CA (US); John Alexander Komoroske, San Francisco, CA (US)

(73) Assignee: Google Inc., Mountain View, CA (US)

(*) Notice: Subject to any disclaimer, the term of this patent is extended or adjusted under 35 U.S.C. 154(b) by 20 days.

(21) Appl. No.: 13/308,757

(22) Filed: Dec. 1, 2011

(65) Prior Publication Data

US 2015/0195156 A1    Jul. 9, 2015

(51) Int. Cl.
*H04L 29/08* (2006.01)
*G06F 17/30* (2006.01)

(52) U.S. Cl.
CPC ......... *H04L 67/02* (2013.01); *G06F 17/30893* (2013.01); *H04L 67/36* (2013.01)

(58) Field of Classification Search
CPC   G06F 3/0481; G06F 9/4443; G06F 17/30864; G06F 3/0483; G06F 17/30867; G06Q 30/0241; G06Q 30/0242; G06Q 30/0277; H04L 67/02; H04L 67/36
USPC ... 715/736, 738, 777, 811; 705/14.41, 14.73
See application file for complete search history.

(56) References Cited

U.S. PATENT DOCUMENTS

| | | | |
|---|---|---|---|
| 5,715,445 A | 2/1998 | Wolfe | |
| 5,727,129 A | 3/1998 | Barrett et al. | |
| 5,946,682 A | 8/1999 | Wolfe | |
| 6,055,569 A | 4/2000 | O'Brien et al. | |
| 6,100,871 A | 8/2000 | Min | |
| 6,151,603 A | 11/2000 | Wolfe | |
| 6,182,133 B1 | 1/2001 | Horvitz | |
| 6,256,712 B1 | 7/2001 | Challenger et al. | |
| 6,301,576 B1 | 10/2001 | Wolfe | |
| 6,467,029 B1 | 10/2002 | Kitayama | |
| 6,604,103 B1 | 8/2003 | Wolfe | |
| 6,976,090 B2 | 12/2005 | Ben-Shaul et al. | |
| 7,047,502 B2 | 5/2006 | Petropoulos et al. | |
| 7,103,594 B1 | 9/2006 | Wolfe | |
| 7,155,336 B2 | 12/2006 | Dorfman et al. | |

(Continued)

FOREIGN PATENT DOCUMENTS

| | | |
|---|---|---|
| JP | 2004536389 A | 12/2004 |
| KR | 20070101237 A | 10/2007 |

(Continued)

OTHER PUBLICATIONS

Christopher Schmitt, "CSS Cookbook, Third Edition," O'Reilly Media, Dec. 24, 2009, pp. 1, 33, 35 and 217-219.*

(Continued)

*Primary Examiner* — Andrew Tank
(74) *Attorney, Agent, or Firm* — Lerner, David, Littenberg, Krumholz & Mentlik, LLP (57) ABSTRACT

A method and system for providing page visibility information are provided herein. Aspects of this disclosure provide an interface by which a browser may make the visibility state of a particular page available to the page itself. The browser may track the visibility state of the page as it changes and store the state in a variable associated with the page. Code executing within the page may query this variable to determine the visibility state and take appropriate action. The browser may provide an application programming interface (API) to allow the page to request the visibility state.

26 Claims, 4 Drawing Sheets

(56) References Cited

U.S. PATENT DOCUMENTS

| | | | |
|---|---|---|---|
| 7,277,924 B1 | 10/2007 | Wichmann et al. | |
| 7,428,701 B1 | 9/2008 | Gavin et al. | |
| 7,467,137 B1 | 12/2008 | Wolfe | |
| 7,480,669 B2 | 1/2009 | Lo et al. | |
| 7,487,147 B2 | 2/2009 | Bates et al. | |
| 7,536,635 B2 | 5/2009 | Racovolis et al. | |
| 7,562,115 B2 | 7/2009 | Zircher et al. | |
| 7,613,712 B2 | 11/2009 | Greenblatt et al. | |
| 7,631,032 B1 | 12/2009 | Refuah et al. | |
| 7,660,815 B1 | 2/2010 | Scofield et al. | |
| 7,685,192 B1 | 3/2010 | Scofield et al. | |
| 7,716,332 B1 | 5/2010 | Topfl et al. | |
| 7,747,749 B1 | 6/2010 | Erikson et al. | |
| 7,802,305 B1 | 9/2010 | Leeds | |
| 7,805,673 B2 | 9/2010 | der Quaeler et al. | |
| 7,840,589 B1 | 11/2010 | Holt et al. | |
| 7,876,335 B1 | 1/2011 | Pittenger et al. | |
| 7,908,336 B2 | 3/2011 | Carlson et al. | |
| 7,987,172 B1* | 7/2011 | Carver | G06F 17/30864 707/706 |
| 8,112,308 B1 | 2/2012 | Ho et al. | |
| 8,260,938 B2 | 9/2012 | Gupta et al. | |
| 8,356,247 B2 | 1/2013 | Krassner et al. | |
| 8,386,509 B1 | 2/2013 | Scofield et al. | |
| 8,391,461 B2 | 3/2013 | Skakkebaek et al. | |
| 8,402,481 B1 | 3/2013 | Urbach | |
| 8,504,907 B2 | 8/2013 | Piersol | |
| 8,549,497 B2 | 10/2013 | Ghorbani et al. | |
| 8,600,968 B2 | 12/2013 | Holenstein et al. | |
| 8,631,340 B2* | 1/2014 | Schreiner | G06F 3/0483 439/152 |
| 8,745,212 B2 | 6/2014 | Jain et al. | |
| 8,892,638 B2 | 11/2014 | Chang et al. | |
| 2002/0075333 A1 | 6/2002 | Dutta et al. | |
| 2003/0005038 A1 | 1/2003 | Codella et al. | |
| 2003/0050906 A1 | 3/2003 | Clifton-Bligh | |
| 2003/0061451 A1 | 3/2003 | Beyda | |
| 2003/0088573 A1 | 5/2003 | Stickler | |
| 2003/0088580 A1 | 5/2003 | Desai et al. | |
| 2003/0182390 A1 | 9/2003 | Alam | |
| 2003/0193994 A1 | 10/2003 | Stickler | |
| 2003/0212760 A1 | 11/2003 | Chen et al. | |
| 2004/0031052 A1 | 2/2004 | Wannamaker et al. | |
| 2004/0267600 A1 | 12/2004 | Horvitz | |
| 2004/0268228 A1 | 12/2004 | Croney et al. | |
| 2005/0055426 A1 | 3/2005 | Smith et al. | |
| 2005/0132296 A1 | 6/2005 | Milic-Frayling et al. | |
| 2005/0240576 A1 | 10/2005 | Piscitello et al. | |
| 2005/0251396 A1 | 11/2005 | Tyler | |
| 2006/0047804 A1 | 3/2006 | Fredricksen et al. | |
| 2006/0055696 A1 | 3/2006 | Loberg | |
| 2006/0064411 A1 | 3/2006 | Gross et al. | |
| 2006/0143568 A1* | 6/2006 | Milener et al. | 715/738 |
| 2006/0282771 A1 | 12/2006 | Vinci | |
| 2007/0005425 A1 | 1/2007 | Bennett et al. | |
| 2007/0198634 A1 | 8/2007 | Knowles et al. | |
| 2007/0204057 A1 | 8/2007 | Shaver et al. | |
| 2007/0208704 A1 | 9/2007 | Ives | |
| 2007/0220010 A1 | 9/2007 | Ertugrul | |
| 2007/0226633 A1 | 9/2007 | Lyle et al. | |
| 2007/0260585 A1 | 11/2007 | Bodine et al. | |
| 2007/0288648 A1 | 12/2007 | Mehanna et al. | |
| 2008/0028064 A1* | 1/2008 | Goyal | G06F 17/30864 709/224 |
| 2008/0052219 A1 | 2/2008 | Sandholm et al. | |
| 2008/0104407 A1 | 5/2008 | Horne et al. | |
| 2008/0140941 A1 | 6/2008 | Dasgupta et al. | |
| 2008/0201332 A1 | 8/2008 | Souders et al. | |
| 2008/0208789 A1 | 8/2008 | Almog | |
| 2008/0249969 A1 | 10/2008 | Tsui et al. | |
| 2008/0256134 A1 | 10/2008 | Bogner et al. | |
| 2008/0276248 A1* | 11/2008 | Xu | G06F 9/4443 719/313 |
| 2008/0295006 A1 | 11/2008 | LuVogt et al. | |
| 2008/0320222 A1 | 12/2008 | Dhodapkar | |
| 2009/0013006 A1 | 1/2009 | Friedl et al. | |
| 2009/0070392 A1 | 3/2009 | Le Roy et al. | |
| 2009/0094196 A1 | 4/2009 | Piwowarski et al. | |
| 2009/0106349 A1 | 4/2009 | Harris | |
| 2009/0132949 A1* | 5/2009 | Bosarge | 715/777 |
| 2009/0158221 A1 | 6/2009 | Nielsen et al. | |
| 2009/0171930 A1 | 7/2009 | Vaughan et al. | |
| 2009/0210806 A1 | 8/2009 | Dodson et al. | |
| 2009/0216639 A1 | 8/2009 | Kapczynski et al. | |
| 2009/0254515 A1 | 10/2009 | Terheggen et al. | |
| 2009/0254643 A1 | 10/2009 | Terheggen et al. | |
| 2009/0265774 A1 | 10/2009 | Malik et al. | |
| 2009/0327424 A1 | 12/2009 | Bernstein et al. | |
| 2010/0005061 A1 | 1/2010 | Basco et al. | |
| 2010/0023581 A1 | 1/2010 | Lahav | |
| 2010/0031366 A1 | 2/2010 | Knight et al. | |
| 2010/0088373 A1* | 4/2010 | Pinkham | G06Q 30/02 709/204 |
| 2010/0107115 A1* | 4/2010 | Sareen et al. | 715/783 |
| 2010/0131902 A1 | 5/2010 | Teran et al. | |
| 2010/0191856 A1 | 7/2010 | Gupta et al. | |
| 2010/0251116 A1 | 9/2010 | Rimas-Ribikauskas et al. | |
| 2010/0306665 A1 | 12/2010 | Milic-Frayling et al. | |
| 2010/0312858 A1 | 12/2010 | Mickens et al. | |
| 2011/0029518 A1 | 2/2011 | Tong | |
| 2011/0029670 A1 | 2/2011 | Klein et al. | |
| 2011/0066732 A1 | 3/2011 | Iwade et al. | |
| 2011/0119361 A1 | 5/2011 | Issa et al. | |
| 2011/0137733 A1* | 6/2011 | Baird | G06Q 30/0272 705/14.68 |
| 2011/0173569 A1 | 7/2011 | Howes et al. | |
| 2011/0199304 A1 | 8/2011 | Walley et al. | |
| 2011/0225494 A1 | 9/2011 | Shmuylovich et al. | |
| 2011/0289317 A1 | 11/2011 | Darapu et al. | |
| 2012/0017146 A1 | 1/2012 | Travieso et al. | |
| 2012/0059911 A1 | 3/2012 | Randhawa et al. | |
| 2012/0084644 A1 | 4/2012 | Robert et al. | |
| 2012/0110435 A1 | 5/2012 | Green | |
| 2012/0137201 A1 | 5/2012 | White et al. | |
| 2012/0151308 A1 | 6/2012 | Falkenberg et al. | |
| 2012/0158740 A1 | 6/2012 | Smola et al. | |
| 2012/0254721 A1 | 10/2012 | Jain et al. | |
| 2012/0254727 A1 | 10/2012 | Jain et al. | |
| 2012/0290924 A1 | 11/2012 | Vick et al. | |
| 2012/0324043 A1 | 12/2012 | Burkard et al. | |
| 2013/0007260 A1 | 1/2013 | Jain et al. | |
| 2013/0185633 A1 | 7/2013 | Bunker et al. | |

FOREIGN PATENT DOCUMENTS

| | | |
|---|---|---|
| KR | 20080111822 | 12/2008 |
| KR | 20100102858 A | 9/2010 |
| KR | 20100112512 | 10/2010 |

OTHER PUBLICATIONS

StackOverflow.com, "Detect If Browser Tab Has Focus," Sep. 2011, 2 pages.*

Eric Haines et al., "Occlusion Culling Algorithms," Nov. 1999, 2 pages.*

Android Developers, "View," Feb. 16, 2011 6 pages.*

StackOverflow, "How could I detect when my application is minimized?" 2 pages.*

Christopher Schmitt, "CSS Cookbook, Third Edition," Dec. 24, 2009 17 pages.*

William Elbers, "How to autostart a HTML5 or Youtube video when you scroll down.", as evidenced by Archive.org, Sep. 6, 2009, https://web.archive.org/web/20090906013450/http://blog.wheelstudios.net/2009/09/howtoautostartahtml5oryoutubevideowhenyouscrolldown/, p. 1-4.* https://developer.mozilla.org/en/Link_prefetching_FAQ (2003).

U.S. Appl. No. 13/175,067, filed Jul. 1, 2011.

U.S. Appl. No. 13/100,615, filed May 4, 2011.

U.S. Appl. No. 13/175,115, filed Jul. 1, 2011.

U.S. Appl. No. 13/174,925, filed Jul. 1, 2011.

U.S. Appl. No. 13/174,928, filed Jul. 1, 2011.

(56) References Cited

OTHER PUBLICATIONS

U.S. Appl. No. 13/182,920, filed Jul. 14, 2011.
U.S. Appl. No. 13/183,824, filed Jul. 15, 2011.
U.S. Appl. No. 13/268,279, filed Oct. 7, 2011.
U.S. Appl. No. 13/233,314, filed Sep. 15, 2011.
U.S. Appl. No. 13/233,300, filed Sep. 15, 2011.
Venoila et al. "T-Cube: A Fast, Self-Disclosing Pen-Based Alphabet". Copyright Date 1994.
Guimbretiere et al. "FlowMenu: Combining Command, Text, and Data Entry". Copyright 2000.
U.S. Appl. No. 13/353,626, filed Jan. 19, 2012.
International Search Report dated Nov. 28, 2012, in International Application No. PCT/US2012/036519.
International Search Report and Written Opinion dated Dec. 14, 2012 for PCT application US2012044896.
Fisher, Darin, "Link Prefetching FAQ," dated Mar. 3, 2003, published by Mozilla Developer Network (MDN), from https://developer.mozilla.org/en/Link_prefetching_FAQ (2003).
International Search Report and Written Opinion for Application No. PCT/US2012/042186 dated Feb. 20, 2013.
International Search Report and Written Opinion for Application No. PCT/US2012/055473 dated Feb. 26, 2013.
International Search Report and Written Opinion for Application No. PCT/US2013/062245 dated Jan. 28, 2014.
International Search Report & Written Opinion dated May 7, 2013 for Application No. PCT/US2013/021927.
Extended European Search Report for Application No. 12831760.9 dated Feb. 17, 2015.

\* cited by examiner

METHOD AND SYSTEM FOR PROVIDING PAGE VISIBILITY INFORMATION

BACKGROUND

As more and more users have access to high-speed Internet, website developers have been free to add increased interactivity to their works. Today, it is common for web pages to have a variety of elements that enhance the browsing experience, including complex interface controls, multimedia elements, website analytic capturing tools, and more. Advances in browser technology have also resulted in the ability to render multiple web pages using a single application. For example, a user may have multiple browser tabs to allow for simultaneous browsing.

In the current environment, interactive page elements may execute as soon as the page is rendered, even if the page is not visible to the user. Sites that feature embedded audio or video may begin to play as soon as the page is loaded. Pages that host games that include timers may continue to run these timers even when the user is unable to interact with the host page. Web sites that use polling to fetch dynamic content continue to poll whether or not the user is viewing the page.

BRIEF SUMMARY

A method and system for providing page visibility information are provided herein. Aspects of this disclosure provide an interface by which a browser may make the visibility state of a particular page available to the page itself. The browser may track the visibility state of the page as it changes and store the state in a variable associated with the page. Code executing within the page may query this variable to determine the visibility state and take appropriate action. The browser may provide an application programming interface (API) to allow the page to request the visibility state.

Aspects of the disclosure describe a computer-implemented method for determining the visibility status of a set of network content. The method may include accessing the network content using a processor, loading the set of network content in a browser, monitoring one or more interface features of the browser to determine a visibility state of the document within the browser, and providing the visibility state of the network content to the network content such that the executable instructions take into account the visibility state during execution. The network content may include instructions for performing at least one function. The visibility state may include one or more values that indicate whether the network content is visible to the user. The method may further include monitoring the one or more interface features to identify a change in visibility state based on a change in the one or more interface features, and sending a notification to the network content that the visibility state has changed. The notification may include at least one of a new visibility state and a visibility state transitional pair. The method may also include storing the visibility state in a document object model associated with the network content. The visibility state may be at least one of visible, hidden, prerender, cache, and preview. The visibility state may be provided to the set of network content in response to a request from the network content for the visibility state. The visibility state may be provided to the set of network content via an application programming interface. The one or more features may be at least one of a window focus, an active browser tab, an inactive browser tab, a browser history, a prerender status, whether a first window is minimized, whether the first window is partially obscured by a second window, whether the first window is fully obscured by the second window, whether a display device is turned off, and whether a screen saver is active on the display device.

Aspects of the disclosure may also provide a non-transitory computer-readable storage medium containing instructions that, when executed by a processor, cause the processor to perform a method. The method may include accessing the network content, loading the set of network content in a browser, monitoring one or more interface features of the browser to determine a visibility state of the document within the browser, and providing the visibility state of the network content to the network content such that the executable instructions take into account the visibility state during execution. The network content may include executable instructions for performing at least one function. The visibility state may include one or more values that indicate whether the network content is visible to the user. The method may further include monitoring the one or more interface features to identify a change in visibility state based on a change in the one or more interface features, and sending a notification to the network content that the visibility state has changed. The notification may include at least one of a new visibility state and a visibility state transitional pair. The method may include storing the visibility state in a document object model associated with the network content. The visibility state may be at least one of visible, hidden, prerender, cache, and preview. The visibility state may be provided to the set of network content in response to a request from the network content for the visibility state. The visibility state may be provided to the set of network content via an application programming interface. The one or more features may be at least one of a window focus, an active browser tab, an inactive browser tab, a browser history, a prerender status, whether a first window is minimized, whether the first window is partially obscured by a second window, whether the first window is fully obscured by the second window, whether a display device is turned off, and whether a screen saver is active on the display device.

Aspects of the disclosure also provide a processing system for determining the visibility status of a set of network content. The processing system may include at least one processor. The at least one processor may be configured to access network content using a processor. The network content may include executable instructions for performing at least one function. The processor may be further configured to load the set of network content in a browser, to monitor one or more interface features of the browser to determine a visibility state of the document within the browser, and to provide the visibility state of the network content to the network content such that the executable instructions take into account the visibility state during execution. The visibility state may include one or more values that indicate whether the network content is visible to the user. The processor may be further configured to monitor the one or more interface features to identify a change in visibility state based on a change in the one or more interface features, and to send a notification to the network content that the visibility state has changed. The notification may include at least one of a new visibility state and a visibility state transitional pair. The processor may be further configured to store the visibility state in a document object model associated with the network content. The visibility state may be at least one of visible, hidden, prerender, cache, and preview. The visibility state may be provided to the set of network content in response to a request from the network content for the visibility state. The visibility state may be provided to the set of network content via an application programming interface. The one or more features may be at least one of a window focus, an active browser tab, an inactive browser tab, a browser history, a prerender status, whether a first window is minimized, whether the first window is partially obscured by a second window, whether the first window is fully obscured by the second window, whether a display device is turned off, and whether a screen saver is active on the display device.

DETAILED DESCRIPTION

A method and system for providing page visibility information are described. Aspects of this disclosure provide an interface by which a web page may query a web browser for the current visibility state of the page. The term "visibility state" is broadly understood to refer to the status of the web page within the browser and the accessibility relationship between the page and the user. By querying the visibility state, code executing within the web page may determine whether the page is rendered in an active browser tab, rendered in a background browser tab, cached in a browser history, prerendered in a hidden browser environment, displayed in a reduced resolution preview, or any other visibility state. The interface may also provide alerts to code executing within the web page in response to changes in the visibility state, such as when a user changes the active browser tab.

Figure 1:
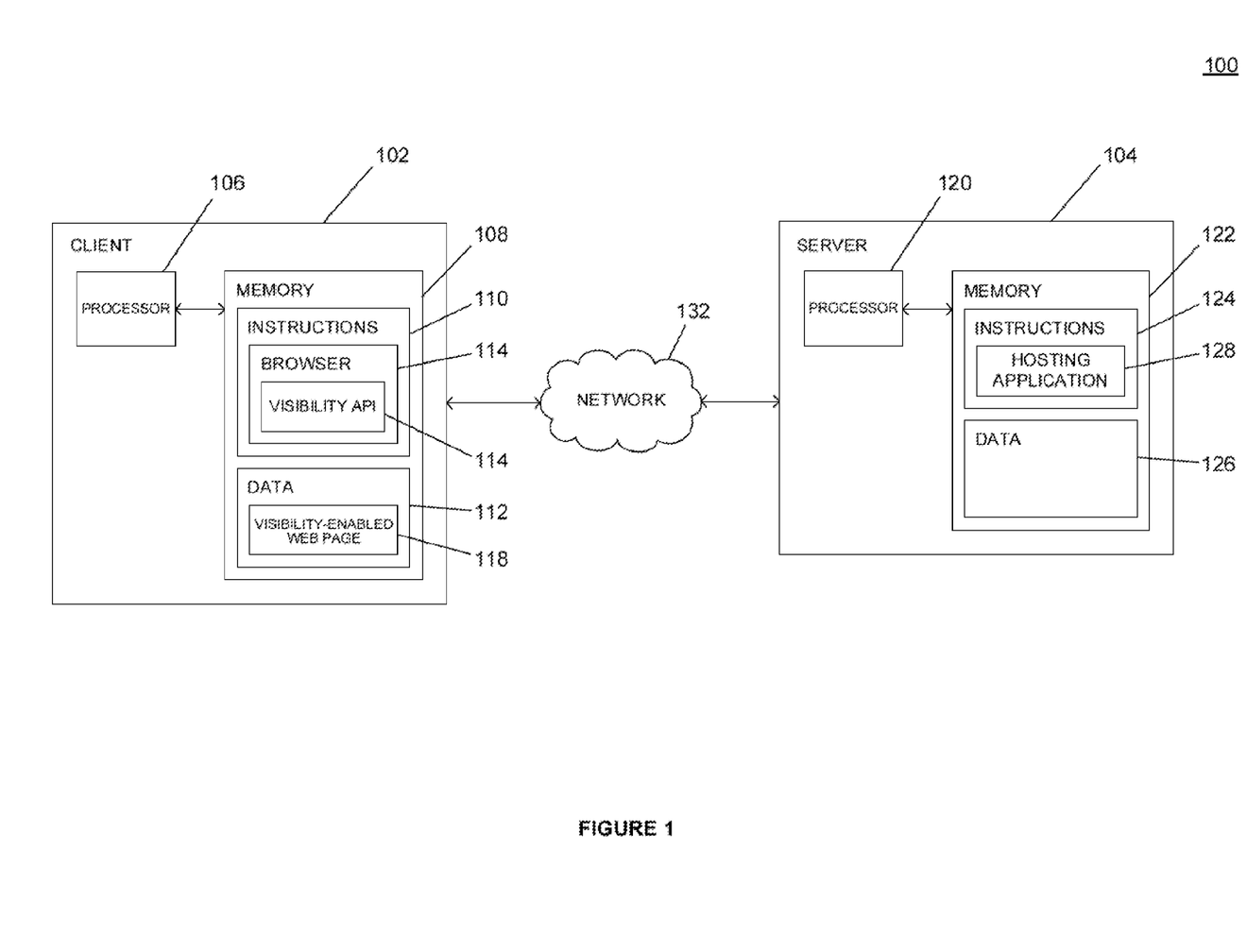
FIG. 1 is a system diagram depicting an example of a network including a client and server in accordance with aspects of the disclosure.

FIG. 1 is a system diagram depicting an example of a network system 100 including a client 102 and a server 104 in accordance with aspects of the disclosure. As shown in FIG. 1, an example network system 100 includes the client 102 and the server 104 in communication via a network 132. The client 102 may execute a browser 114 to retrieve a set of network content, such as a visibility-enabled web page 116 hosted by the server 104. Although examples described herein relate to the use of a visibility-enhanced web page, the same techniques may apply to any network content that is capable of accessing a visibility application programming interface (API) to determine a page state. The visibility-enabled web page 116 may include code that is responsive to the visibility state of the web page as identified using a visibility API 118 provided by the browser 114.

The client 102 may include a processor 106, a memory 108 and other components typically present in general purpose computers. The memory 108 may store instructions 110 and data 112 that are accessible by the processor 106. The processor 106 may execute the instructions 110 and access the data 112 to control the operations of the client 102.

The processor 106 may be any suitable processor, such as various commercially available general purpose processors. Alternatively, the processor 106 may be a dedicated controller such as an application-specific integrated circuit ("ASIC") or a field-programmable gate array ("FPGA").

The memory 108 may be any type of tangible memory operative to store information accessible by the processor 106, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

Although FIG. 1 functionally illustrates the processor 106 and memory 108 as each being within a single block respectively, it should be understood that the processor 106 and memory 108 may actually comprise multiple processors and memories that may or may not be stored within the same physical housing. Accordingly, references to a processor, computer or memory will be understood to include references to a collection of processors, computers or memories that may or may not operate in parallel.

The instructions 110 may be any set of instructions to be executed directly (such as machine code) or indirectly (such as scripts) by the processor 106. For example, the instructions 110 may be stored as computer code on a non-transitory computer-readable medium. In that regard, the terms "instructions" and "programs" may be used interchangeably herein. The instructions 110 may be stored in object code format for direct processing by the processor 106, or in any other computer language including scripts or collections of independent source code modules that are interpreted on demand or compiled in advance. Functions, methods and routines of the instructions are explained in more detail below (see FIGS. 2-4).

In order to facilitate the operations of the client 102, the instructions 110 may comprise a browser 114. The browser 114 may provide an interface for viewing and interacting with network content. In particular, the browser 114 may provide for the rendering of network content, such as the visibility-enhanced web page 116. The browser 114 may display network content according to a variety of formats, including but not limited to text files, hyper-text markup language (HTML) documents, multimedia content such as WAV and MP3 files, images such as JPEG, BMP, and GIF files, extensible markup language (XML) files, spreadsheets, or any other kinds of data formats.

The browser 114 may also provide a visibility API 118 for providing visibility state information to the visibility-enhanced web page 116. The visibility API 118 may monitor the visibility state of one or more of the pages accessed by the web browser. As the one or more pages are active, background rendered, cached, previewed, etc., the visibility API 118 may alter the visibility state for the page in accordance with the updated states.

Although the present examples describe the visibility state as associated with a particular state variable maintained by the browser, the visibility state may also be dynamically queried and/or generated based on a request from a visibility-enhanced web page. In other words, the visibility API 118 may track the visibility state, or the state may be determined on-demand. For example, the state variable may be maintained within a document object model associated with the visibility-enhanced web page 116. Code associated with the visibility-enhanced web page 116 may execute to query the state variable, such as by accessing a document property (e.g., document.visibilityState), or calling an API function, which returns a string value corresponding to the particular visibility state. The visibility API 118 may interface with one or more scripts or executable code associated with the web page, such as via JAVASCRIPT, ADOBE FLASH, or any other programming language.

The data 112 may be retrieved, stored or modified by the processor 106 in accordance with the instructions 110. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. The data may comprise any information sufficient to identify the relevant information, such as numbers, descriptive text, proprietary codes, references to data stored in other areas of the same memory or different memories (including other network locations) or information that is used by a function to calculate the relevant data.

Although a number of discrete modules and data sets (e.g., 114, 116) are identified in connection with the client 102, the functionality of these modules and data may overlap and/or exist in a fewer or greater number of modules than what is shown, with such modules residing at one or more processing devices, which may be geographically dispersed. The data 112 may include the visibility-enhanced web page 116 as described above. The visibility-enhanced web page 116 may include one or more code elements that execute based on the visibility state of the visibility-enhanced web page 116. For example, the visibility-enhanced web page 116 may include code that pauses multimedia content when the visibility-enhanced web page 116 is not visible to the user. Further examples of operations that may be performed by the visibility-enhanced web page 116 are described below (see FIG. 4).

The client 102 may be at one node of network 132, such as the Internet, and be operative to directly and indirectly communicates with other nodes of the network. For example, the client 102 may comprise a network client that is operative to communicate with the server 104 via the network 132 such that the client 102 receives the visibility-enhanced web page 116 from the server 104. The visibility-enhanced web page 114 may include code that transmits data to or from the server in response to the visibility state of the visibility-enhanced web page 116. For example, the visibility-enhanced web page 116 may notify the server 104 when the visibility-enhanced web page 116 becomes visible to ensure the server 104 maintains accurate website analytics for the visibility-enhanced web page 116.

The server 104 may comprise a personal computer, a personal digital assistants ("PDA"), a tablet PC, a netbook, a rack mounted server, a laptop, a mobile phone, a smart phone etc. Indeed, the server 104 in accordance with the systems and methods described herein may comprise any device operative to process instructions and transmit data to and from humans and/or other computers including general purpose computers, network computers lacking local storage capability, etc.

The server 104 may be similarly configured to the client 102 as described above. For example, the server 104 may comprise a processor 120 coupled to a memory 122. As described above with respect to the memory 108, the memory 122 may include instructions 124 and data 126. The instructions 124 may include a hosting application 128.

The hosting application 128 operates to provide the visibility-enhanced web page 116 to the client 102. The hosting application 128 may also be operative to receive signals from the visibility-enhanced web page 116, such as a notification that the content of the visibility-enhanced web page 116 has been viewed.

The network 132, and the intervening nodes between the client 102 and the server 104 may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Figure 2:
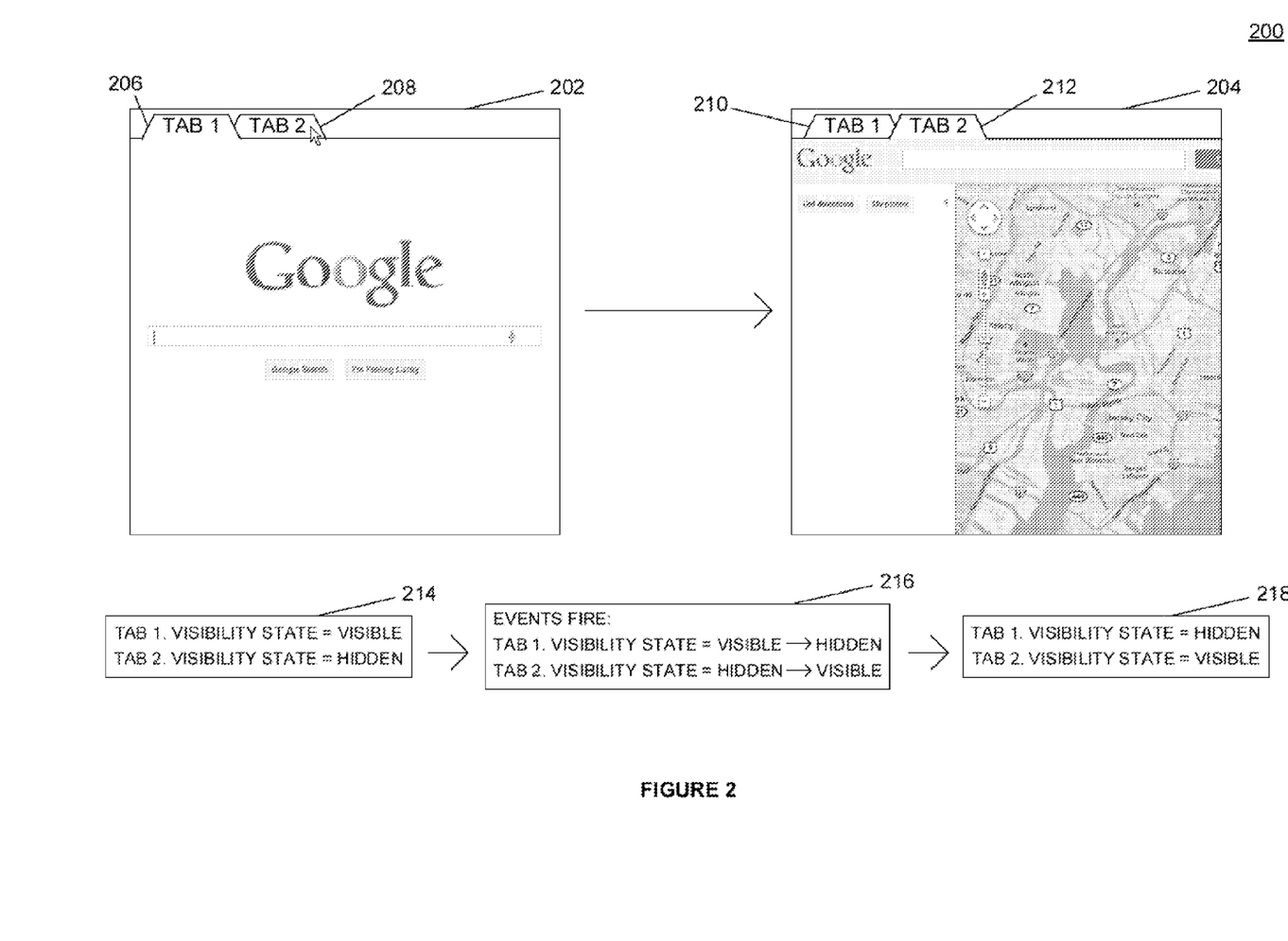
FIG. 2 is block diagram depicting an example of a page visibility state change event in accordance with aspects of the disclosure.

FIG. 2 is block diagram depicting an example of a page visibility state change event in accordance with aspects of the disclosure. One example of a page visibility state change event involves changing the active browser tab. A common feature for modern web browsers is the ability to render multiple pages at once, and to allow the user to select between the rendered pages. One way of implementing this functionality is to include multiple "tabs" that operate as interface controls for switching between active rendered pages. When the user selects the tab corresponding to the page, the page is displayed in the main browser window. These tabs may be persistent such that multiple tabs are selectable at any given time, regardless of the displayed page. A visibility state change may occur when the user selects a new tab.

The present example describes a first browser state 202 and a second browser state 204. The first browser state 202 depicts a web browser with two tabs, tab one 206 and tab two 208. In the first browser state, tab one 206 is the active browser tab, with the associated content displayed in the main browser window. Tab two 208 is an inactive tab, with the associated content hidden from the user. The corresponding visibility states for these tabs are displayed in block 214, with tab one having the visibility state of visible, and tab two having the visibility state of hidden. Tab two 208 may be selected using a cursor 209.

Upon selection of tab two 208, the content associated with tab one 206 is hidden and the content associated with tab two 208 is displayed in the main browser window. This change in visibility state may result in a visibility change event, as described in block 216. The visibility change event may be used to notify code executing in one or more sets of content that the visibility state of that content has changed. In the present example, the visibility event may notify tab one that tab one's visibility state has changed from visible to hidden, and tab two that tab two's visibility state has changed from hidden to visible. The API may allow for each page to separately register for visibility change events and/or register for events associated with a particular status or status change. The visibility state events may indicate both the start and finish status of a given state change, or only the finish status.

The second browser state 204 depicts the browser after tab two has been made active. As with the first browser state, the second browser state 204 depicts tab one 210 and tab two 212, but tab two 212 is now active and the associated content displayed in the main browser window. Block 218 describes the visibility state of each tab, which is now the inverse of the states described in block 214.

Figure 3:
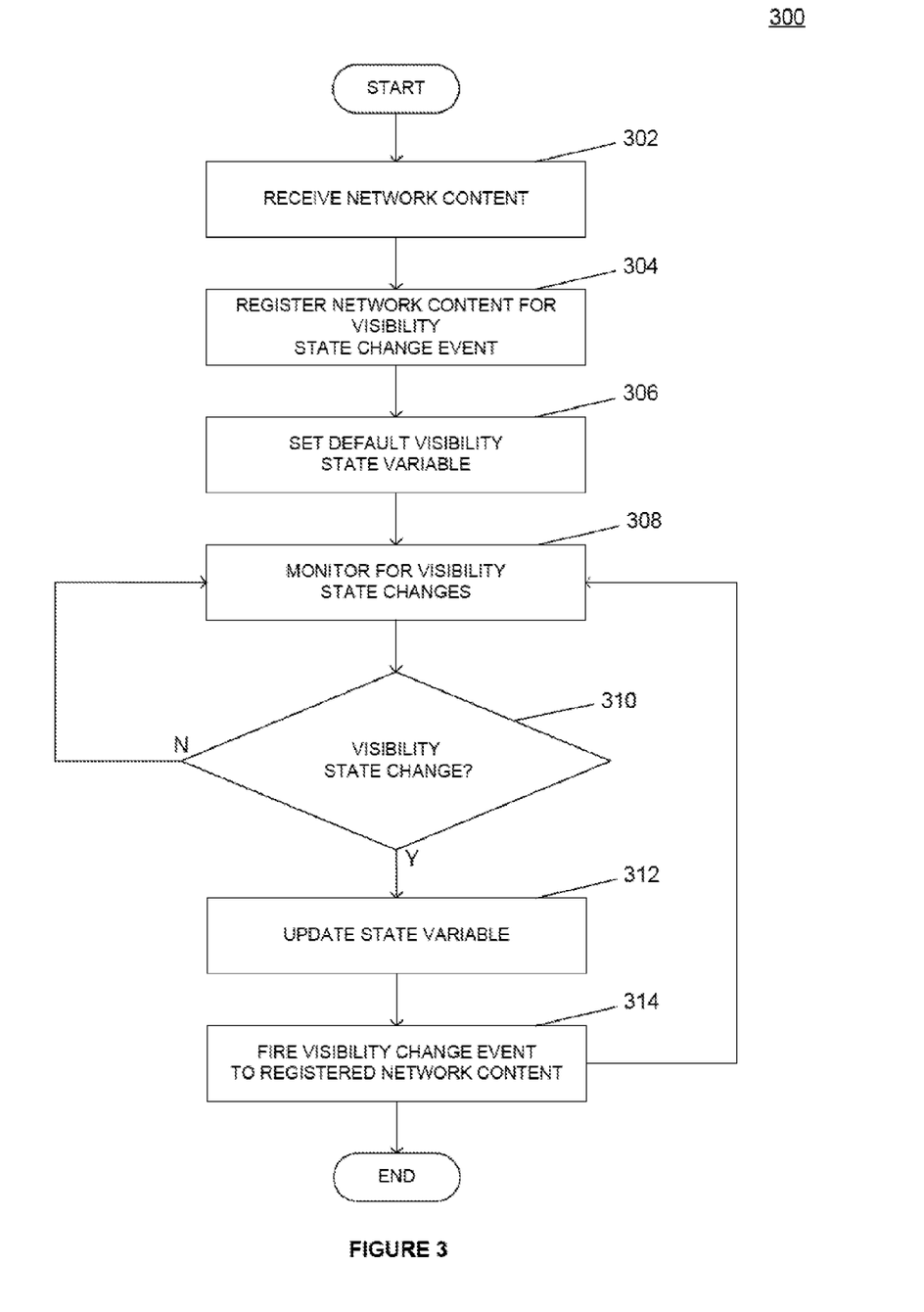
FIG. 3 is a flow diagram depicting an example of a method for monitoring a visibility state of a web page using a web browser in accordance with aspects of the disclosure.

FIG. 3 is a flow diagram depicting an example of a method 300 for monitoring a visibility state of a web page using a web browser in accordance with aspects of the disclosure. As described above, as network content is received and rendered by a browser, the browser may identify and/or track the visibility state of the content. The browser may provide this visibility state upon request to the network content and/or generate a visibility change event to report the state change to the network content. In this manner the network content may take appropriate action based on the visibility state of the page (see FIG. 4).

At action 302, the browser receives a set of network content, such as the visibility-enhanced web page 116 received from the server 104 (see FIG. 1). Although a visibility-enhanced web page 116 is used in the present example, any sort of network content that can be displayed in a browser could be used, as the network content does not necessarily need to include visibility-enhanced features. For example, the browser may proactively take action on the network content based on the visibility state even if the network content does not explicitly include code to do so, such as pausing multimedia presentations when the page is not visible to the user.

At action 304, the network content may be registered for visibility state change events. For example, the network content may wish to execute particular code in response to a particular visibility state change. The method 400 may provide the network content the ability to register for visibility change events generated by the browser when the visibility state change occurs. As described above, the visibility change events may include a notification of the state transition (e.g., a previous state and an updated state), or just an updated state (see FIG. 2).

At action 306, a default visibility state variable is set for the network content. The default visibility state may set based on the way in which the network content was accessed. For example, if the user typed the content address into an address bar and the content was immediately rendered, the default state may be identified as "visible." If the content was prerendered in response to a predicted user navigation event, the default state may be identified as "prerender." If the content was accessed in response to opening a new background browser tab, then the default visibility state may be identified as "hidden." If the content is previewed in a lower resolution thumbnail, the default visibility state may be identified as "preview." In some aspects, the visibility state variable may be associated with a document object model of the network content.

At action 308, the browser monitors for changes to the content visibility state. As described above, visibility state changes may include, but are not limited to, changing the active browser tab, prerendering of network content, caching network content (e.g., navigating to a new link and storing a cached version of the network content in the "back-forward" cache), minimizing the active browser window, previewing of network content, etc. The visibility state may be monitored by a variety of actions, including interface and callback hooks or other monitoring of user input actions. For example, the state "visible" may be triggered when the network content is rendered in the active browser window, and the active browser window is not minimized. The state "hidden" may be triggered when the network content is displayed in an inactive tab or the containing window is minimized. Aspects of the disclosure may include a framework for defining different visibility states based on various interface features. Interface states may be determined in a variety of manners, including but not limited to determining whether the network content is present in a window that has focus, determining whether the network content is present in an active browser tab, determining whether the network content is present in an inactive browser tab, determining whether the network content is present in a browser history, determining whether the network content is prerendered, determining whether the window with the network content is minimized, determining whether network content is present in a window that is fully or partially obscured by another window, determining whether a display device attached to the computer executing the browser is turned off, or determining whether screen saver is active on the display device.

At action 310, the browser identifies whether a visibility state change has occurred based on the monitoring action 308. If no visibility state change has occurred, the monitoring action 308 may continue until such a state change occurs or the browser is closed. If a visibility state change occurs, the variable associated with the visibility state of the network content is updated at action 312.

At action 312, the visibility state variable is updated depending upon the visibility state change that has occurred. In response to a change in the visibility state variable, a visibility change event may be sent to content that is registered for such an event at action 314. The method may end after firing the visibility change event, or it may return to action 308 to monitor for further state changes.

Figure 4:
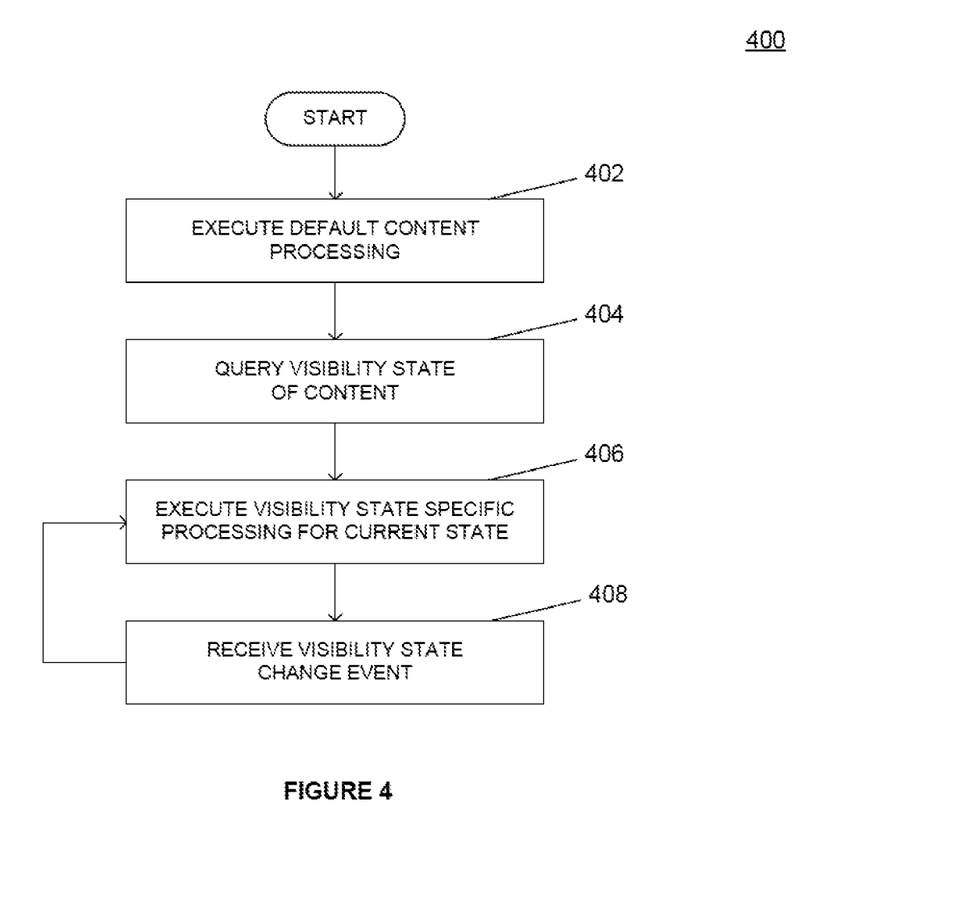
FIG. 4 is a flow diagram depicting an example of a method for utilizing a page visibility state in a script executing in a web page in accordance with aspects of the disclosure.

FIG. 4 is a flow diagram depicting an example of a method 400 for utilizing a content visibility state in a script executing in a web page in accordance with aspects of the disclosure. The method is operable to take various actions based on the visibility state of the network content as received from a browser including a visibility API in accordance with aspects of the disclosure. The network content may thus take appropriate action based on the visibility state that may include optimization of the user browsing experience, relaying website analytics data, conserving network bandwidth, or otherwise optimizing interaction with the network content based on the content's visibility status.

At action 402, a set of network content is rendered within a browser and default processing for the content is enabled. The network content may include executable code, scripted code, or any other data that may enable the rendered instance of the network content to communicate with the browser. For example, default processing actions may include beginning to buffer a video, requesting one or more resources from a server, displaying a user interface for an application, etc.

At action 404, the network content queries the visibility state of the content. As described above, the network content may request the visibility state using an API provided by the browser. In a specific example, the API may provide a document property such as document.hidden, which returns a value of true if the visibility state of the document is hidden. Other API functions may be provided for specific statuses, such as visible, hidden, prerender, cache, or preview. API functions may also be provided that test for multiple states. For example, the document.hidden property may return true if the network content is in any non-visible state. The visibility state may also be stored as an entry within a document object model associated with the network content.

At action 406, the network content performs visibility state specific processing depending upon the current state. The visibility state specific processing may be any appropriate processing executed in response to a particular visibility state, including but not limited to the following specific examples:

A web page with one or more advertisements may wish to maintain accurate website analytics in a prerendering situation. When the page is displayed with a status of prerendering, the page may notify the hosting server that the page is a prerender, and advertisement impressions should not be registered. When the visibility state changes to visible, the page may notify the server indicating that a valid advertisement impression has been recorded.

A puzzle game may include a timer that keeps track of how long the user has taken to solve the puzzle. The game may pause the timer when the content associated with the game is not in a "visible" state, and start the timer when the content returns to a visible state.

A web application that hosts dynamic content may poll a hosting server at a particular interval to detect updates to the dynamic content. The web application may pause polling operations when the content is not in a "visible" state to ensure that bandwidth is not wasted. When the content returns to a visible state, polling operations may resume.

A streaming video site may not wish to enable playback of an embedded video until the user opens a browser tab containing the site, to avoid beginning playback of the video before the user is ready to watch.

A communication application or collaborative editing environment may allow multiple users to interact. When the application or editing environment is not visible to the user (e.g., a visibility state other than "visible"), the application or editing environment may mark the user's status as "away" or "unavailable."

At action 408, the network content may receive a visibility state change event, such as described above (see FIG. 3). The network content may include explicit instructions for processing such an event. Various implementations may monitor for specific states and/or specific state transition pairs. In response to the state change event, new state specific processing may occur at action 406. The method 400 may proceed as long as the execution of the network content continues.

The actions of the illustrated methods are not intended to be limiting. The functionality of the methods can exist in a fewer or greater number of actions than what is shown and, even with the depicted methods, the particular order of events may be different from what is shown in the figures.

The systems and methods described herein advantageously provide an interface by which network content may determine the current visibility state of the network content. Developers may use the visibility state information in a variety of manners to improve the user experience and the host experience, allowing for accurate website analytics, improvement of the hosting of multimedia content, conservation of bandwidth, and a variety of other uses.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for determining the visibility status of web content, the method comprising:
   accessing the web content using a processor, the web content comprising executable instructions for performing at least one function;
   loading the web content in a browser;
   determining a default visibility state based on how the web content was accessed, the default state including at least a visible state and a prerender state, wherein the visible state is determined based on a first type of access and the prerender state is determined based on a second type of access different from the first type of access;
   monitoring one or more interface features of the browser to determine changes as presented on a display device in the default visibility state, such that a current visibility state of the web content currently present within a window of the browser comprises one or more values that indicate whether the web content is visible to a user,
   wherein determining the changes as presented on the display device comprises determining at least one of: when the window has focus, when the window is minimized, when the window is partially obscured by a second window, when a browser tab is active or inactive, when the display device is powered off, and when a screen saver is active on the display device; and
   providing the current visibility state of the web content to the web content such that the web content performs visibility state specific processing depending on the current visibility state, the visibility state specific processing including relaying website analytics data to a server when the web content is in the visible state, and the visibility state specific processing further including notifying the server that the web content is in the prerender state and that impressions should not be registered.

2. The method of claim 1, further comprising:
   monitoring the one or more interface features to identify a change in the current visibility state based on a change in the one or more interface features; and
   sending a notification to the web content that the visibility state has changed.

3. The method of claim 2, wherein the notification comprises at least one of a new visibility state and a visibility state transitional pair.

4. The method of claim 1, further comprising storing the current visibility state in a document object model associated with the web content.

5. The method of claim 1, wherein the default visibility states further include at least one of a hidden state, a cache state, and a preview state.

6. The method of claim 1, wherein the current visibility state is provided to the web content in response to a request from the web content for the visibility state.

7. The method of claim 1, wherein the current visibility state is provided to the web content via an application programming interface.

8. The method of claim 1, wherein the default visibility state is determined to be the prerender state if the content was prerendered in response to a predicted user navigation event, and wherein the default visibility state is determined to be the visible state if the content is rendered in an active browser window that is not minimized.

9. The method of claim 1, wherein the visibility state specific processing further includes waiting until the web content is in the visible state before enabling playback of an embedded video.

10. The method of claim 1, wherein the visibility state specific processing further includes, in a multiple user interactive environment, marking a user's status as unavailable if the current visibility state is not the visible state.

11. A non-transitory computer-readable storage medium containing instructions that, when executed by a processor, cause the processor to perform a method comprising:
    accessing web content, the web content comprising executable instructions for performing at least one function;
    loading the set of network content in a browser;
    determining a default visibility state based on how the web content was accessed, the default state including at least a visible state and a prerender state, wherein the visible state is determined based on a first type of access and the prerender state is determined based on a second type of access different from the first type of access;
    monitoring one or more interface features of the browser to determine changes as presented on a display device in the default visibility state, such that a current visibility state of the web content currently present within a window of the browser comprises one or more values that indicate whether the web content is visible to a user,
    wherein determining the changes as presented on the display device comprises determining at least one of: when the window has focus, when the window is minimized, when the window is partially obscured by a second window, when a browser tab is active or inactive, when the display device is powered off, and when a screen saver is active on the display device; and
    providing the current visibility state of the web content to the web content such that the web content performs visibility state specific processing depending on the current visibility state, the visibility state specific processing including relaying website analytics data to a server when the web content is in the visible state, and the visibility state specific processing further including notifying the server that the web content is in the prerender state and that impressions should not be registered.

12. The non-transitory computer readable medium of claim 11, wherein the method further comprises:
    monitoring the one or more interface features to identify a change in the current visibility state based on a change in the one or more interface features; and
    sending a notification to the network content that the current visibility state has changed.

13. The non-transitory computer readable medium of claim 12, wherein the notification comprises at least one of a new visibility state and a visibility state transitional pair.

14. The non-transitory computer readable medium of claim 11, wherein the method further comprises storing the current visibility state in a document object model associated with the web content.

15. The non-transitory computer readable medium of claim 11, wherein the default visibility state further includes at least one of a hidden state, a cache state, and a preview state.

16. The non-transitory computer readable medium of claim 11, wherein the current visibility state is provided to the web content via an application programming interface.

17. The computer-readable medium of claim 11, wherein the visibility state specific processing further includes waiting until the web content is in the visible state before enabling playback of an embedded video.

18. The computer-readable medium of claim 11, wherein the visibility state specific processing further includes, in a multiple user interactive environment, marking a user's status as unavailable if the current visibility state is not the visible state.

19. A processing system for determining the visibility status of a set of web content, the processing system comprising:
    at least one processor configured to:
    access web content using a processor, the web content comprising executable instructions for performing at least one function;
    load the web content in a browser;
    determine a default visibility state based on how the web content was accessed, the default state including at least a visible state and a prerender state, wherein the visible state is determined based on a first type of access and the prerender state is determined based on a second type of access different from the first type of access;
    monitor one or more interface features of the browser to determine changes as presented on a display device in the default visibility state, such that a current visibility state of the web content currently present within a window of the browser comprises one or more values that indicate whether the web content is visible to a user,
    wherein determining the changes as presented on the display device comprises determining at least one of: when the window has focus, when the window is minimized, when the window is partially obscured by a second window, when a browser tab is active or inactive, when the display device is powered off, and when a screen saver is active on the display device; and
    provide the current visibility state of the web content to the web content such that the web content performs visibility state specific processing depending on the current visibility state, the visibility state specific processing including relaying website analytics data to a server when the web content is in the visible state, and the visibility state specific processing further including notifying the server that the web content is in the prerender state and that impressions should not be registered.

20. The processing system of claim 19, wherein the processor is further configured to:
    monitor the one or more interface features to identify a change in the current visibility state based on a change in the one or more interface features; and
    send a notification to the network content that the visibility state has changed.

21. The processing system of claim 20, wherein the notification comprises at least one of a new visibility state and a visibility state transitional pair.

22. The processing system of claim 19, wherein the processor is further configured to store the current visibility state in a document object model associated with the network content.

23. The processing system of claim 19, wherein the default visibility states further include at least one of a hidden state, a cache state, and a preview state.

24. The processing system of claim 19, wherein the current visibility state is provided to the web content via an application programming interface.

25. The processing system of claim 19, wherein the visibility state specific processing further includes waiting until the web content is in the visible state before enabling playback of an embedded video.

26. The processing system of claim 19, wherein the visibility state specific processing further includes, in a multiple user interactive environment, marking a user's status as unavailable if the current visibility state is not the visible state.

\* \* \* \* \*